United States Patent
Chen et al.

(10) Patent No.: US 7,352,800 B2
(45) Date of Patent: Apr. 1, 2008

(54) METHOD OF PARTIAL PARALLEL INTERFERENCE CANCELLATION

(75) Inventors: Yih-Min Chen, ChungLi (TW);
Hsu-Ching Wang, KaoHsung (TW);
Chun-Cheng Chen, ChangHua (TW);
Fu-Yen Kuo, HsinChu (TW)

(73) Assignee: BenQ Corporation, Tao-Yuan (TW)

( * ) Notice: Subject to any disclaimer, the term of this patent is extended or adjusted under 35 U.S.C. 154(b) by 748 days.

(21) Appl. No.: 10/843,447

(22) Filed: May 12, 2004

(65) Prior Publication Data
US 2005/0031022 A1 Feb. 10, 2005

(30) Foreign Application Priority Data
May 13, 2003 (TW) .............................. 92112869 A (51) Int. Cl.
*H04B 1/00* (2006.01)
(52) U.S. Cl. ...................... 375/148; 333/150; 333/151; 333/152; 333/153; 333/154; 333/155; 333/193; 333/194; 333/195; 333/196; 342/150; 342/151; 342/152; 342/153; 342/154; 342/155; 342/193; 342/194; 342/195; 342/196; 370/319; 370/320; 370/321; 370/330; 370/335; 370/342; 370/345; 370/347

(58) Field of Classification Search ................. 375/148
See application file for complete search history.

(56) References Cited

U.S. PATENT DOCUMENTS

| | | | |
|---|---|---|---|
| 6,548,115 B1* | 4/2003 | Gibson et al. | 427/282 |
| 7,068,743 B1* | 6/2006 | Suzuki | 375/345 |
| 7,099,378 B2* | 8/2006 | Dunyak et al. | 375/148 |
| 7,242,708 B1* | 7/2007 | Wang et al. | 375/148 |
| 2004/0196892 A1* | 10/2004 | Reznik | 375/148 |

OTHER PUBLICATIONS

Neiyer Correal, "A DSP Based DS-CDMA Multiuser Receiver Employing Partial Parallel Interference Cancellation" IEEE Journal on Selected Areas in Communications, vol. 17, No. 4, Apr. 1999.*
R. Michael Buerhere, "Analysis of DS-CDMA Parallel Interference Cancellation With Phase and Timing Errors" IEEE Journal on Selected Areas in Communications, vol. 14, No. 8, Oct. 1996.*

* cited by examiner

*Primary Examiner*—Shuwang Liu
*Assistant Examiner*—Dhaval V Patel
(74) *Attorney, Agent, or Firm*—WPAT, P.C.; Justin I. King (57) ABSTRACT

A method of Partial Parallel Interference Cancellation (PPIC) is provided for recursively eliminating the Multiple Access Interference from a received signal. Such method is to use a recursion way to eliminate all the Multiple Access Interference (MAI) one by one from the received signal. Moreover, the present invention is to take the output of the pre-stage as the input of the present stage with the recursion method so that we can use only one operating circuit to obtain the function the MAI eliminating.

12 Claims, 10 Drawing Sheets

Prior Art

METHOD OF PARTIAL PARALLEL INTERFERENCE CANCELLATION

FIELD OF THE INVENTION

The invention relates to a method for eliminating the Multiple Access Interference (MAI), in particular to a simplification method of Partial Parallel Interference Cancellation (PPIC) for eliminating the Multiple Access Interference.

BACKGROUND OF THE INVENTION

In recent years, with the great progress of technology in mobile telecommunication, cell phones have satisfied the people's desire of wireless communication and relieved users from the fetter of traditional fixed line phone. The mobile communication not only makes us be freer, but also closes the distance from people to people.

In the third generation mobile telecommunication system, the Code Division Multiple Access (CDMA) system plays an important role; however, such spreading telecommunication techniques suffer the serious problem of Multiple Access Interference (MAI), which is described as following:

Assume there are total k users in the system, and each of them transmits a set signal of binary data, which is shown as:

$$b_k(t) = \sum_{i=-\infty}^{\infty} b_{k,i} P_T(t - iT)$$

wherein, $b_{k,i} \in \{\pm 1\}$ indicates the $i^{th}$ data bit of the $k^{th}$ user, and $P_T(t)$ indicates the rectangular pulse with amplitude being 1 and period being T.

And each user respectively owns a set of spreading codes, which is shown as:

$$a_k(t) = \sum_{j=-\infty}^{\infty} a_{k,j} P_{T_c}(t - jT_c)$$

wherein, $a_{k,j} \in \{\pm 1\}$ indicates the $j^{th}$ chip of the $k^{th}$ user, and $P_{T_c}(t)$ indicates the rectangular pulse with amplitude being 1 and period being $T_c$. Here we can define the ratio of the bit time period T to the chip time period $T_c$ as the process gain N, that is, $N = T/T_c$, which is also called Spreading Factor (SF).

Therefore, the Binary Phase Shift Keying (BPSK) signals transmitted by the $k^{th}$ user can be shown as:

$$s_k(t) = \sqrt{2P_k} a_k(t) b_k(t)$$

wherein, $P_k$ means the signal energy of the $k^{th}$ user. After transmitted through the Multi-path Fading, the signals will be received by the Rake Receiver, and the received signals is shown as:

$$r(t) = \sum_{k=1}^{K} \alpha_k s_k(t - \tau_k) + n(t)$$

$$= \sum_{k=1}^{K} \alpha_k \sqrt{2P_k} \, a_k(t - \tau_k) b_k(t - \tau_k) + n(t)$$

$$= \sum_{k=1}^{K} \sum_{i=-\infty}^{\infty} \sum_{j=0}^{N-1} \alpha_k \sqrt{2P_k} \, b_{k,i} a_{k,j} P_{T_c}(t - iT - jT_c - \tau_k) + n(t)$$

wherein, $\tau_k$ means the delay time of the $k^{th}$ user, $a_k$ means the Multi-path Fading, and n(t) means the Added White-Gaussian-Noise (AWGN).

The most common method for eliminating the interference caused by other users in the present day is to adopt the Interference Cancellation, which can be divided into two systems: the Successive Interference Cancellation (SIC) and the Parallel Interference Cancellation (PIC). Aimed at the PIC, the following will give a concise description.

Figures 1, 1A:
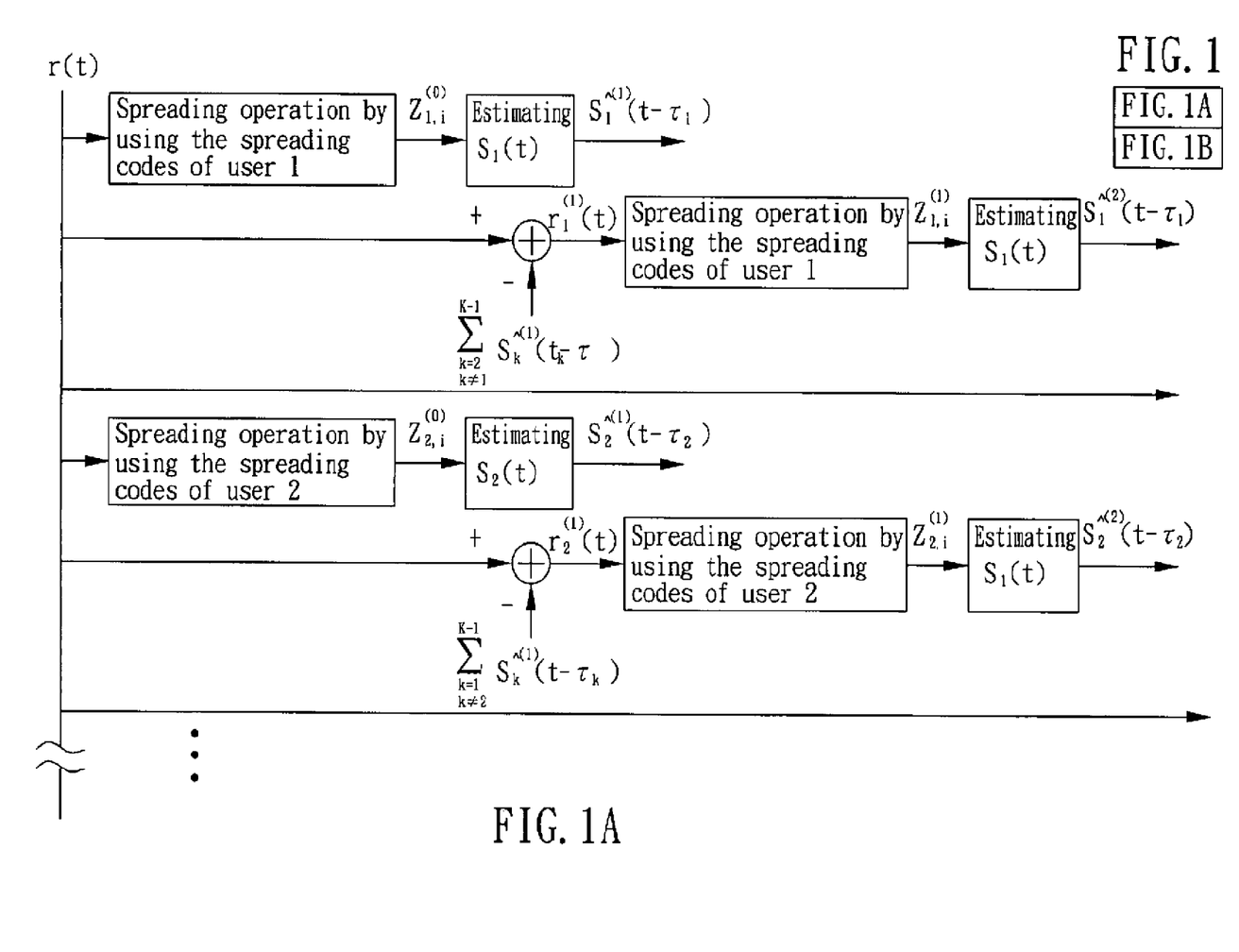
FIG. 1 is a schematic diagram showing the structure of the traditional Parallel Interference Cancellation with k users.
Figure 1B:
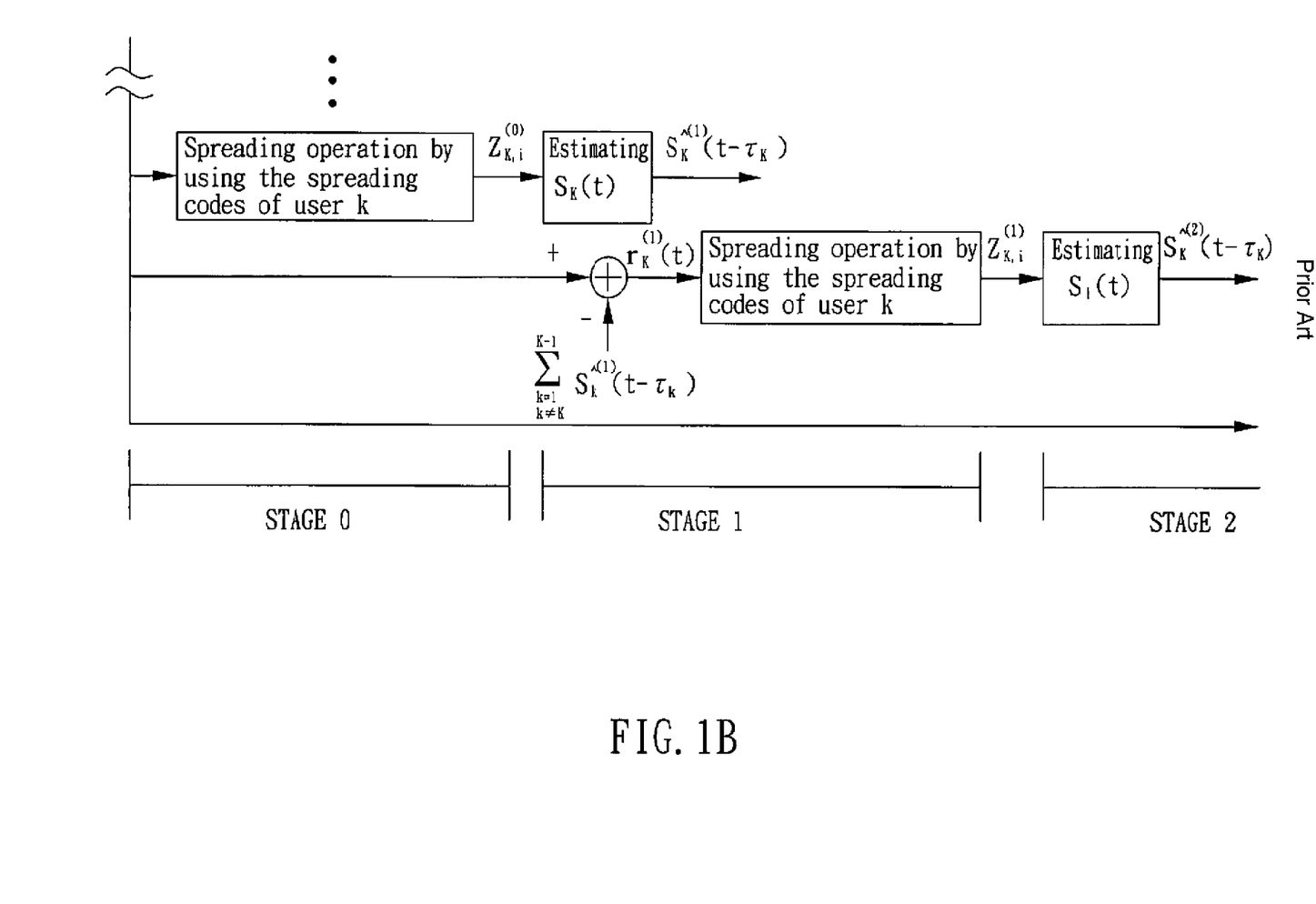

Please refer to FIG. 1, which shows the structure diagram of the traditional Parallel Interference Cancellation with k users. Here we firstly consider the asynchronous CDMA system, in which the delay times from different users to the receiver will be different and can be arranged in order from shortest to longest as: $\tau_1 < \tau_2 < \tau_3 < \ldots < \tau_k$. The spirit of the PIC is to eliminate all the interference caused by other users simultaneously. "STAGE 0" shown in FIG. 1 means the traditional receiver, "STAGE 1" means the first stage of the PIC, and so on, and then "STAGE s" means the $s^{th}$ stage of the PIC. When the receiver is in STAGE 0, for the $k^{th}$ user, the received signals and the $k^{th}$ user's spreading codes will be carried out the "Despread" operating, and thus get a value called "Decision Statisitc", labeled as $Z_{k,i}^{(0)}$; wherein, the superscript (0) means "STAGE 0", the suffix k means "the $k^{th}$ user", and the suffix i means "the $i^{th}$ data bit". The formula of $Z_{k,i}^{(0)}$ can be shown as:

$$Z_{i,i}^{(0)} = \frac{1}{T} \int_{iT+\tau_k}^{(i+1)T+\tau_k} r(t) a_k(t - iT - \tau_k) \, dt$$

In STAGE 1 of the PIC, the first step is to rebuild the estimation signals, that is, to carry out the "Respread" operating with the pre-stage Decision Statisitc $Z_{k,i}^{(0)}$ as well as the $k^{th}$ user's spreading codes so as to get an estimation value of the $i^{th}$ data bit in STAGE 1, which is expressed as:

$$s_k^{\wedge(1)}(t - \tau_k) = \sum_{i=-\infty}^{\infty} \frac{2}{T} Z_{k,i}^{(0)} a_k(t - iT - \tau_k)$$

wherein, the superscript (1) of $s_k^{\wedge(1)}(t-\tau_k)$ means "STAGE 1". Similarly, we can get other users' estimation signal values.

For the $k^{th}$ user, any other users are all regarded as interference. Therefore, to obtain an effect of approximated singular user, we can eliminate other users' estimation signals from the received signal. Wherein the effect of approximated singular user means the effect without MAI, which can be expressed as:

$$r_k^{(1)}(t) = r(t) - \sum_{\substack{l=1, \\ l \neq k}}^{K} s_l^{\wedge(1)}(t - \tau_l)$$

moreover, the Decision Statistic of STAGE 1 is expressed as:

$$Z_{k,i}^{(1)} = \frac{1}{T}\int_{T+\tau_k}^{(i+1)T+\tau_k} r_k^{(1)}(t)a_k(t-iT-\tau_k)dt$$

so the formulas of the PIC in STAGE s can be shown as:
(1) The estimation signal value:

$$\hat{s}_k^{(s)}(t-\tau_k) = \sum_{i=-\infty}^{\infty} \frac{2}{T} Z_{k,i}^{(s-1)} a_k(t-iT-\tau_k)$$

(2) The signal after removing all the interference:

$$r_k^{(s)}(t) = r(t) - \sum_{\substack{l=1,\\l\neq k}}^{K} \hat{s}_l^{(s)}(t-\tau_l)$$

(3) The Decision Statistic of STAGE s:

$$Z_{k,i}^{(s)} = \frac{1}{T}\int_{T+\tau_k}^{(i+1)T+\tau_k} r_k^{(s)}(t)a_k(t-iT-\tau_k)dt$$

The spirit of the PIC is to eliminate other users' estimation signals from the received signal so as to get the effect of approximated singular user. However, if there is something wrong in $r_k^{(s)}(t)$ the signal after the interference eliminated, the Decision Statistic of STAGE s $Z_{k,i}^{(s)}$ thereby may be error and furthermore the Decision Statistic of the next stage will be affected so as to result in the phenomenon of Error Propagation. Therefore, in practice, the method of Partial Interference Cancellation can be used to improve the performance of traditional PIC, and the formula can be expressed as:

$$r_k^{(s)}(t) = r(t) - P_s \sum_{\substack{l=1,\\l\neq k}}^{K} \hat{s}_l^{(s)}(t-\tau_l)$$

wherein, $P_s$ means the Partial Factor of STAGE s, and $0<P_s<1$. Such method is so-called Parallel Partial Interference Cancellation (PPIC).

However, the aforesaid PPIC needs large calculations of Respread-Despread so that it requires a very large amount of computations. In addition, the multiple-path signals are varying, which is especially a leaden encumbrance for both mobile stations and base stations. So we need a novel method to improve such problems.

SUMMARY OF THE INVENTION

The major objective of the present invention is to provide a method for eliminating the Multiple Access Interference (MAI).

Another objective of the present invention is to provide a method for recursively eliminating the MAI instead of the traditional method that is complicated and redundant.

A further object of the present invention is to provide a simplified method that is applicable in the Parallel Partial Interference Cancellation.

In order to achieve the aforesaid objects, the present invention provides a simplified method of Parallel Partial Interference Cancellation that can be used in the asynchronous Direct Spread-Code Division Multiple Access (DS-CDMA) signal mode. Such method is to use a recursion way to eliminate all the Multiple Access Interference one by one from the received signals, including the following steps:

A. receiving a system delay parameter and offering a recursion parameter, the system delay parameter including a plurality of delay times of different users' received signal delays;

B. building a related matrix $\Re$ based on the system delay parameter, and wherein, $$\Re_{k\times k} = \lfloor r_{i,j} \rfloor$$

$$r_{i,j} = \begin{cases} \rho_{i,j}^{(m)}, & i<j \\ \rho_{j,i}^{(v)}, & i>j \end{cases}$$

$$\rho_{i,j}^{(m)} = \frac{1}{T}\int_0^{T-|\tau_i-\tau_j|} a_i(t)a_j(t+|\tau_i-\tau_j|)dt$$

$$\rho_{i,j}^{(v)} = \frac{1}{T}\int_{T-|\tau_i-\tau_j|}^{T} a_i(t)a_j(t+|\tau_i-\tau_j|-T)dt$$

k means the total users in the system,
i means the $i^{th}$ user,
j means the $j^{th}$ user,
$a_i$ means the spreading codes of the $i^{th}$ user,
$a_j$ means the spreading codes of the $j^{th}$ user,
$\tau_i$ means the delay time of the $i^{th}$ user,
$\tau_j$ means the delay time of the $j^{th}$ user;

C. computing an input parameter $Z_{i,w}^{(0)}$:

$$Z_{i,w}^{(0)} = \frac{1}{T}\int_{wT+\tau_i}^{(w+1)T+\tau_i} r(t)a_i(t-wT-\tau_i)dt$$

wherein,
$Z_{i,w}^{(0)}$ means the $w^{th}$ bit value of the $i^{th}$ user,
r(t) means the received signals;

D. setting an executive parameter equal to 1, expressed as s=1

E. computing a result value, which can be shown as:

$$Z_{i,w}^{(s)} = Z_{i,w}^{(0)} - P_s \left\{ \sum_{l=1}^{k-1} [Z_{i,w}^{(s-1)} \rho_{i,l}^{(m)} + Z_{i,w+1}^{(s-1)} \rho_{i,l}^{(v)}] + \sum_{l=k+1}^{K} [Z_{l,w}^{(s-1)} \rho_{i,l}^{(m)} + Z_{l,w-1}^{(s-1)} \rho_{i,l}^{(v)}] \right\}$$

wherein, $P_s$ means the Partial Factor of the STAGE s;

F. diagnosing whether the executive parameter is the recursion parameter? If "Yes", then going to step H, or going to step G;

G. adding 1 progressively to the executive parameter then executing step E;

H. ending the process.

DETAILED DESCRIPTION OF THE INVENTION

Matched with corresponding drawings, the preferable embodiments of the invention are presented as following and hope they will benefit your esteemed reviewing committee members in reviewing this patent application favorably.

The traditional PPIC needs large operations of Spread-Despread so that it requires a very large amount of computations; the following will continue to derive a formula in order to avoid such redundant operations:

$$Z_{k,i}^{(s)} = \frac{1}{T}\int_{T+\tau_k}^{(i+1)T+\tau_k} r_k^{(v)}(t)a_k(t-iT-\tau_k)dt \quad (1)$$

$$= \frac{1}{T}\int_{T+\tau_k}^{(i+1)T+\tau_k}\left[r(t)-P_s\sum_{\substack{l=1\\l\neq k}}^{K}\hat{s}_l^{(s)}(t-\tau_l)\right]a_k(t-iT-\tau_k)dt$$

$$= \frac{1}{T}\int_{T+\tau_k}^{(i+1)T+\tau_k} r(t)a_k(t-iT-\tau_k)dt -$$

$$P_s\frac{1}{T}\int_{T+\tau_k}^{(i+1)T+\tau_k}\sum_{\substack{l=1\\l\neq k}}^{K}\hat{s}_l^{(s)}(t-\tau_l)a_k(t-iT-\tau_k)dt$$

$$= Z_{k,i}^{(0)} - P_s\frac{1}{T}\sum_{\substack{l=1\\l\neq k}}^{K}\int_{T+\tau_k}^{(i+1)T+\tau_k}\hat{s}_l^{(s)}(t-\tau_l)a_k(t-iT-\tau_k)dt$$

$$= Z_{k,i}^{(0)} - P_s\frac{1}{T}\sum_{\substack{l=1\\l\neq k}}^{K}\int_{T+\tau_k}^{(i+1)T+\tau_k}$$

$$\left[\sum_{i=-\infty}^{\infty}\frac{2}{T}Z_{l,i}^{(s-1)}a_l(t-iT-\tau_l)\right]a_k(t-iT-\tau_k)dt$$

Figure 2A:
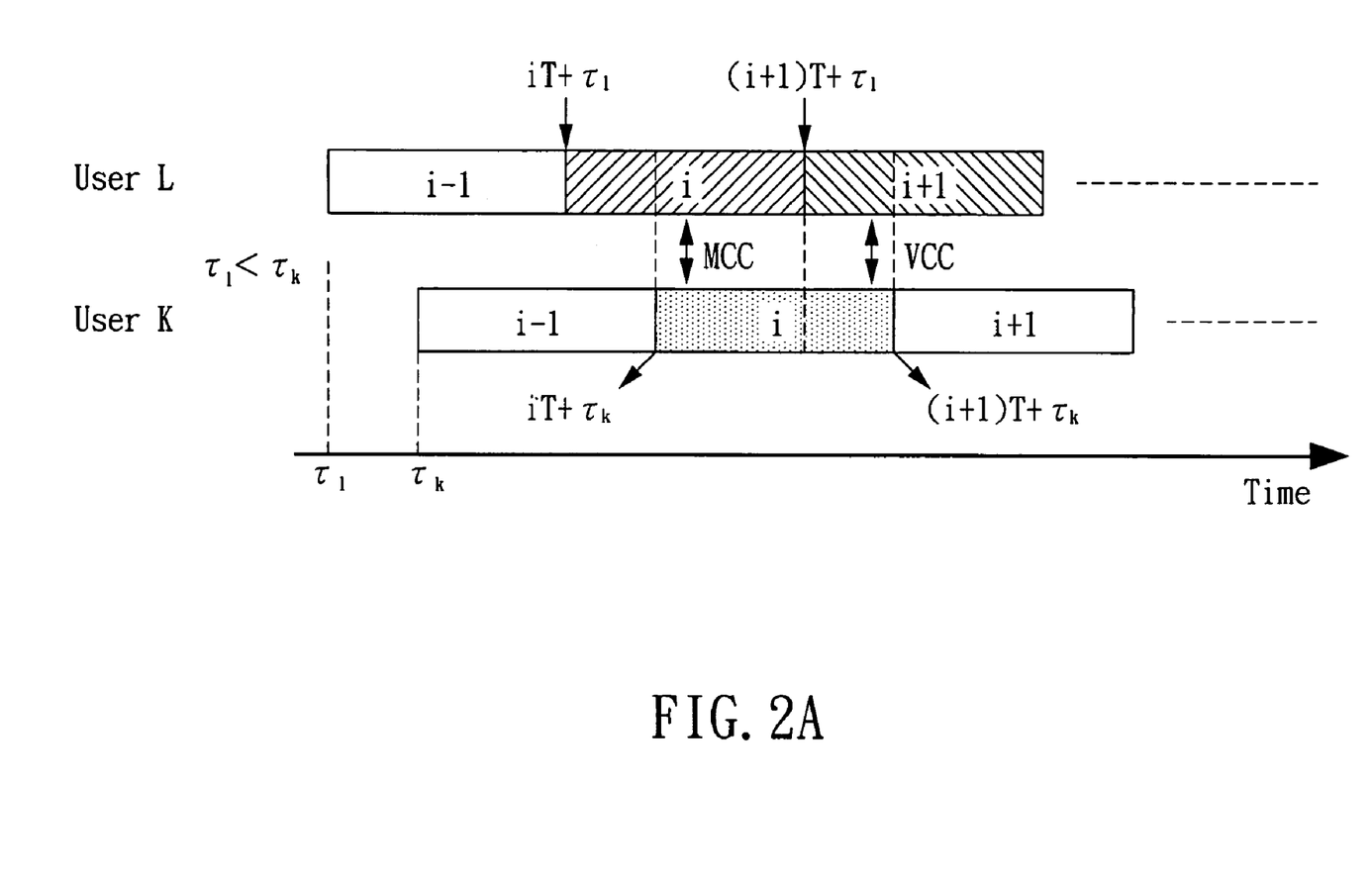
FIG. 2A is a schematic diagram showing the cross correlation between the user l and the user k when k>l.

Because we are considering the asynchronous CDMA receiving system, and assume that the delay times of all users can be arranged in order from shortest to longest as: $\tau_1<\tau_2<\tau_3<\ldots<\tau_k$, the item of interference cancellation (the secondary item) in the formula (1) needs to be discussed in accordance with the duration of the delay time. Firstly, if $\tau_l<\tau_k$ (that is l<k), from the FIG. 2A, which is a schematic diagram showing the cross correlation between the user l and the user k, we can find that user k's $i^{th}$ bit overlaps the interval of user l's $i^{th}$ and $(i+1)^{th}$ bit, causing the two different interval overlapping. Here we define the Partial Cross-Correlation of the same bit area as the Main of the whole Cross-Correlation, abbreviated as MCC, and define the Partial Cross-Correlation of the different bit area as the Vice of the whole Cross-Correlation, abbreviated as VCC. And the formulas of the MCC as well as the VCC can be shown as:

$$\rho_{k,l}^{(m)} = \frac{1}{T}\int_0^{T-|\tau_k-\tau_l|} a_k(t)a_l(t+|\tau_k-\tau_l|)dt \quad (2)$$

$$\rho_{k,l}^{(v)} = \frac{1}{T}\int_{T-|\tau_k-\tau_l|}^{T} a_k(t)a_l(t+|\tau_k-\tau_l|-T)dt \quad (3)$$

Figure 2B:
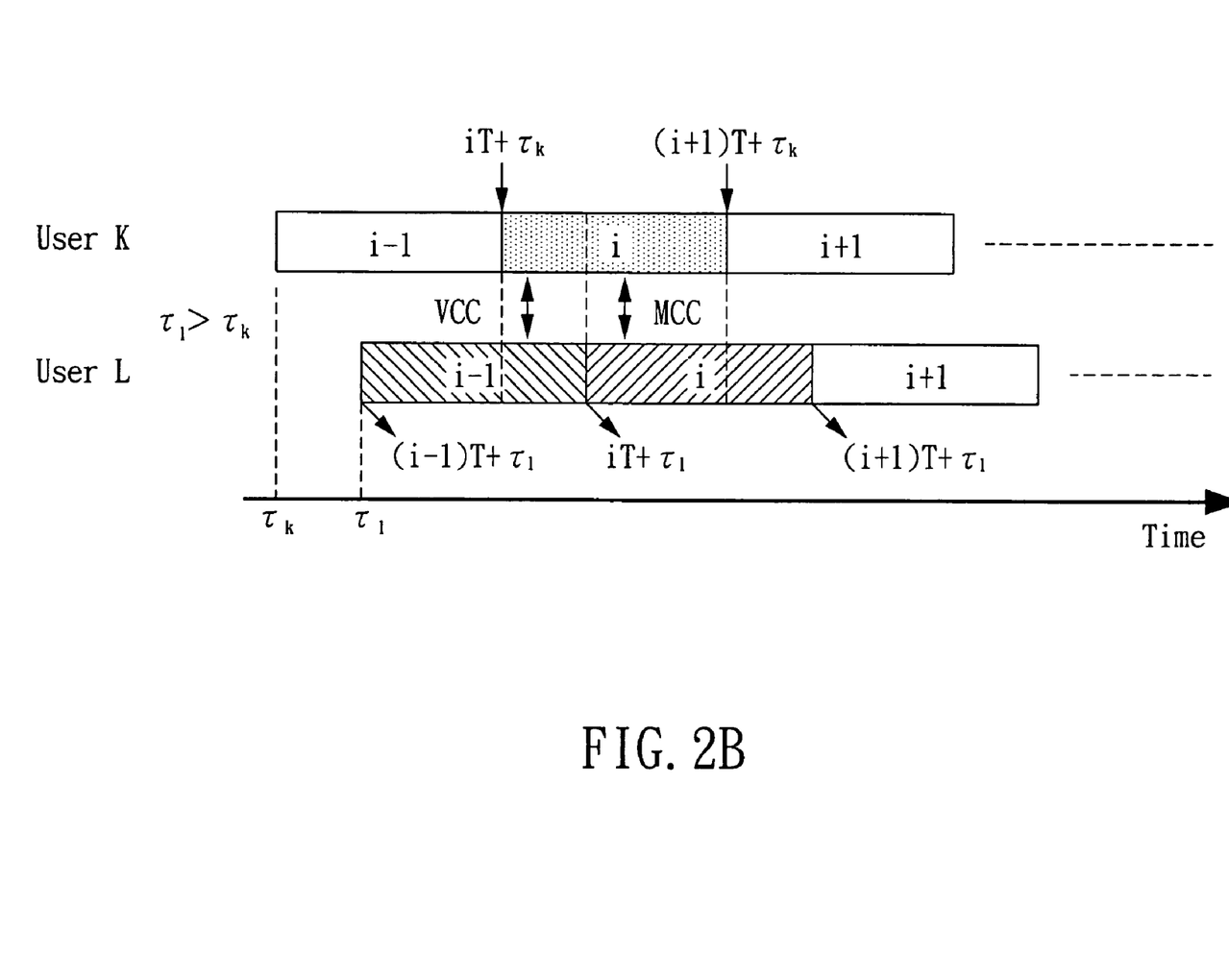
FIG. 2B is a schematic diagram showing the cross correlation between the user l and the user k when k<l.

Please refer to FIG. 2B, which is a schematic diagram showing the cross correlation between the user l and the user k when $\tau_l>\tau_k$. Similarly, if $\tau_l>\tau_k$ (that is l>k), user k's $i^{th}$ bit will overlap the interval of user l's $i^{th}$ and $(i-1)^{th}$ bit.

To put the formula (2) (3) into formula (1), we can get:

$$Z_{k,i}^{(s)} = Z_{k,i}^{(0)} - P_s\frac{1}{T}\sum_{\substack{l=1\\l\neq k}}^{K}\int_{T+\tau_k}^{(i+1)T+\tau_k} \quad (4)$$

$$\left[\sum_{i=-\infty}^{\infty}\frac{2}{T}Z_{l,i}^{(s-1)}a_l(t-iT-\tau_l)\right]a_k(t-iT-\tau_k)dt$$

$$= Z_{k,i}^{(0)} - P_s\left\{\frac{1}{T}\sum_{l=1}^{k-1}\int_{T+\tau_k}^{(i+1)T+\tau_k}\right.$$

$$\sum_{i=-\infty}^{\infty}\frac{2}{T}Z_{l,i}^{(s-1)}a_l(t-iT-\tau_l)a_k(t-iT-\tau_k)dt +$$

$$\frac{1}{T}\sum_{l=k+1}^{K}\int_{T+\tau_k}^{(i+1)T+\tau_k}$$

$$\left.\sum_{i=-\infty}^{\infty}\frac{2}{T}Z_{l,i}^{(s-1)}a_l(t-iT-\tau_l)a_k(t-iT-\tau_k)dt\right\}$$

$$= Z_{k,i}^{(0)} - P_s\left\{\sum_{l=1}^{k-1}[Z_{l,i}^{(s-1)}\rho_{k,l}^{(m)} + Z_{l,i+1}^{(s-1)}\rho_{k,l}^{(v)}] +\right.$$

$$\left.\sum_{l=k+1}^{K}[Z_{l,i}^{(s-1)}\rho_{k,l}^{(m)} + Z_{l,i-1}^{(s-1)}\rho_{k,l}^{(v)}]\right\}, s=1,2$$

From the formula (4), we can find that without the traditional operation of Respread-Despread, the output of the PPIC in STAGE s can be recursively got from that of the PPIC in STAGE 0. As long as the information of the delay time can be acquired, the cross correlation thus can be computed. Therefore, from the off-line calculating, we can complete the related calculating in advance, storing and utilizing it when needed. One embodiment of the storing form is to use matrixes. For example, in a K×K matrix with the diagonal elements being zero, the upper triangular matrix can store the Main of the whole Cross-Correlation (MCC) and the lower triangular matrix can store the Vice of the whole Cross-Correlation (VCC), which is shown as:

$$\Re_{K \times K} = [r_{i,j}]$$

$$r_{i,j} = \begin{cases} \rho_{i,j}^{(m)}, & i < j \\ \rho_{j,i}^{(v)}, & i > j \end{cases}$$

wherein, i means the row vector and j means the column vector.

Figure 3:
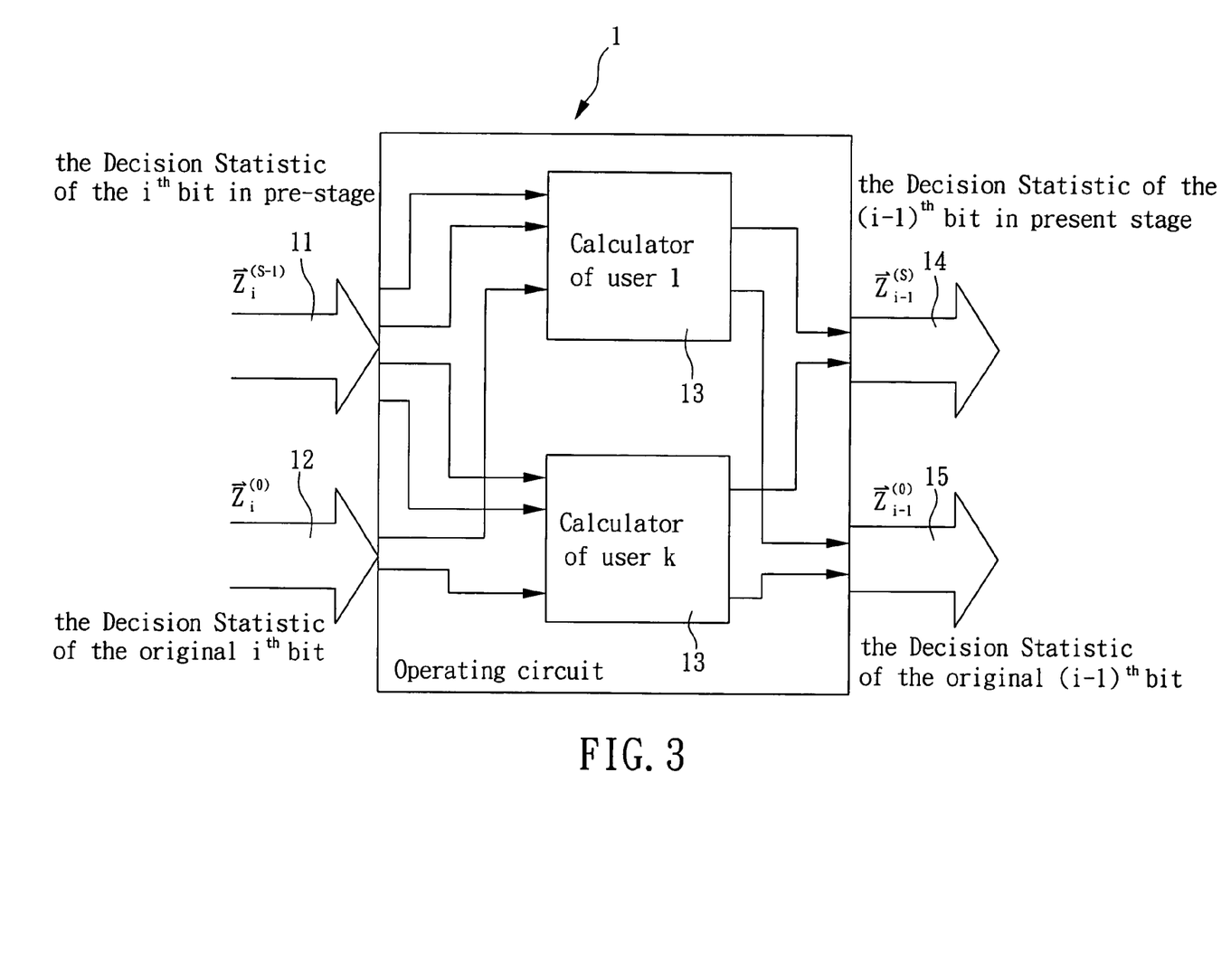
FIG. 3 is a schematic diagram showing the structure in accordance with the present invention.

Please refer to the FIG. 3, which is a schematic diagram showing the structure in accordance with the present invention. In summary, the spirit of the present invention is to take the output of the pre-stage as the input of the present stage with the recursion method, so we can use only one operating circuit to obtain all the required functions. As shown in FIG. 3, the operating circuit of the present invention 1 comprises two inputs: the Decision Statistic of the $i^{th}$ bit in pre-stage 11, and the Decision Statistic of the original $i^{th}$ bit 12. The operating circuit 1 also has two outputs: the Decision Statistic of the $(i-1)^{th}$ bit in present stage 14, and the Decision Statistic of the original $(i-1)^{th}$ bit 15. Besides, the operating circuit 1 has total K calculators 13, each of which is connected to the two inputs. On the basis of these two inputs, each calculator will compute and output the Decision Statistic of the $(i-1)^{th}$ bit in present stage 14; meanwhile, it will protract the Decision Statistic of the original $i^{th}$ bit 12, and then output the Decision Statistic of the original $(i-1)^{th}$ bit 15.

Figure 4:
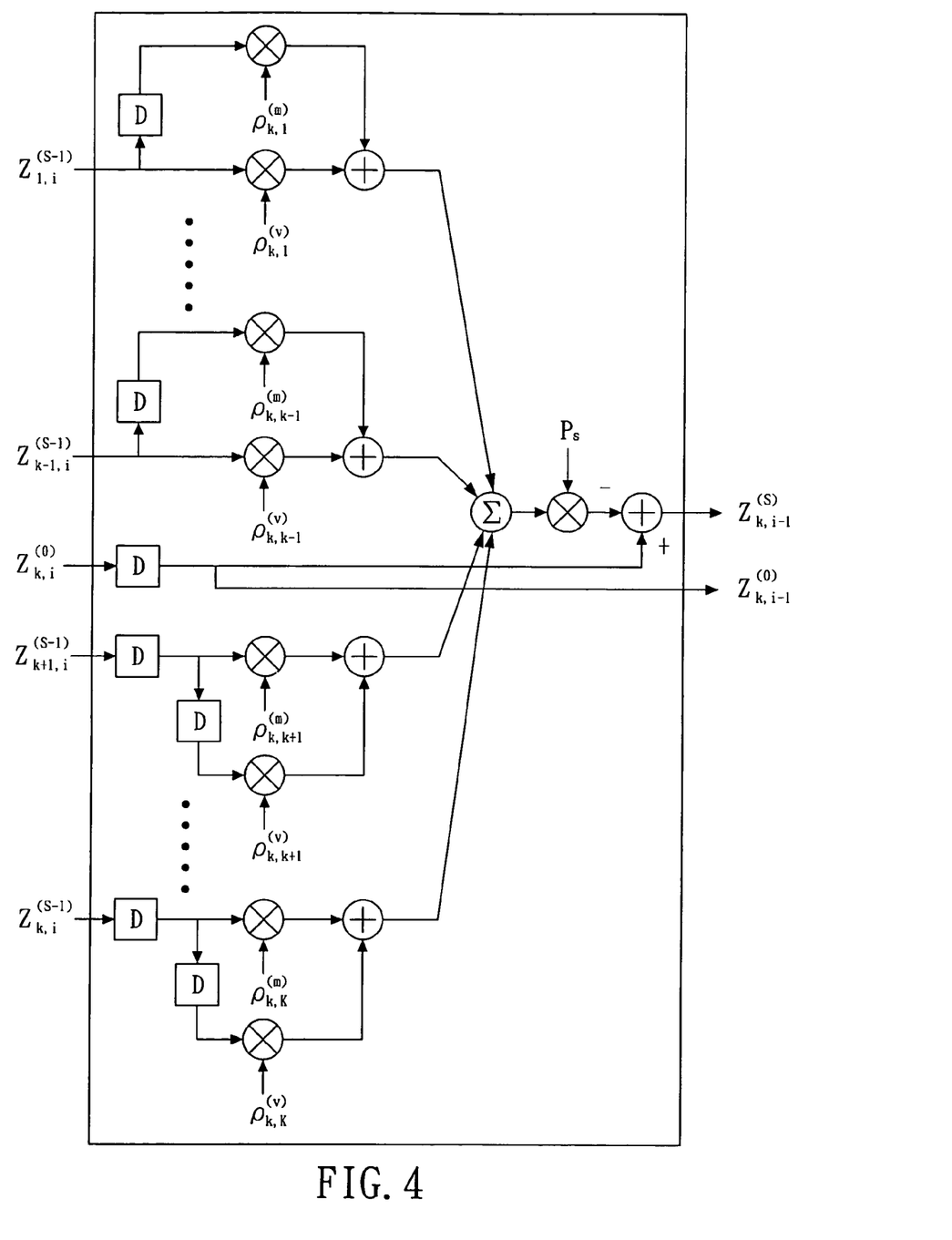
FIG. 4 is a block diagram illustrating an embodiment of the calculator in accordance with the present invention.

Please refer to the FIG. 4, which is a block diagram illustrating an embodiment of the calculator 13 (in FIG. 3) in accordance with the present invention. Wherein, the value of MCC and VCC can be acquired in advance and stored with a matrix, so the information of the cross correlation can be acquired in any time. As shown in FIG. 4, except the signal that belongs to the user himself, the other received signals firstly are processed with the Cross Correlation, and then adjusted as well as summed with the Partial Factor, and finally subtracted the signal that belongs to the user himself so as to get the result the Decision Statistic of the $(i-1)^{th}$ bit in present stage. Moreover, through a time delayer, the Decision Statistic of the original $i^{th}$ bit will be outputted to be the Decision Statistic of original the $(i-1)^{th}$ bit.

Figure 5:
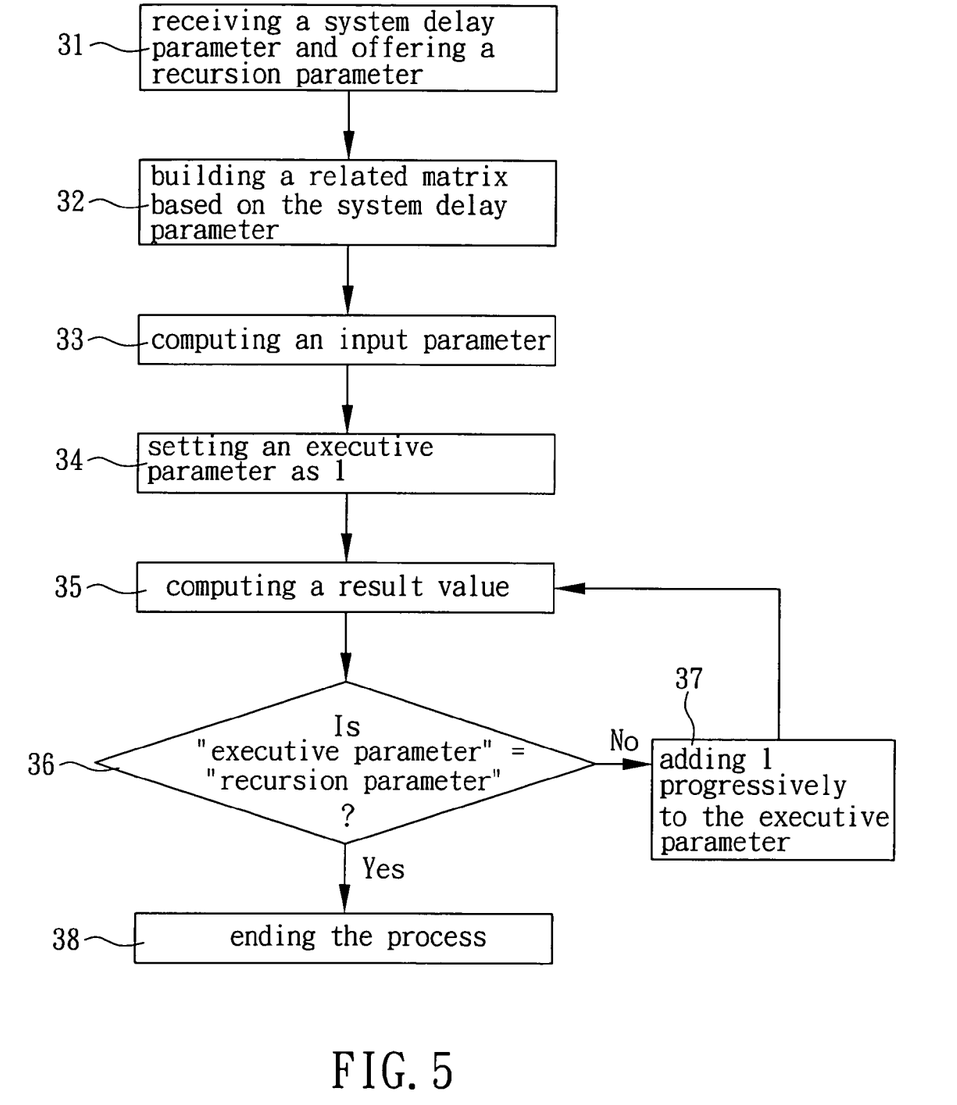
FIG. 5 is a schematic diagram showing the process flow in accordance with the present invention.

Please refer to the FIG. 5, which is a schematic diagram showing the process flow in accordance with the present invention. The present invention provides a simplified Parallel Partial Interference Cancellation method that can be used in the asynchronous Direct Spread-Code Division Multiple Access (DS-CDMA) mode. Such method is to use a recursion way to eliminate all the Multiple Access Interference one by one from the received signal, including the following steps:

Step 31: receiving a system delay parameter and offering a recursion parameter;

Step 32: building a related matrix $\Re$ based on the system delay parameter, and wherein, $$\Re_{k \times k} = [r_{i,j}]$$

$$r_{i,j} = \begin{cases} \rho_{i,j}^{(m)}, & i < j \\ \rho_{j,i}^{(v)}, & i > j \end{cases}$$

-continued $$\rho_{i,j}^{(m)} = \frac{1}{T} \int_0^{T-|\tau_i - \tau_j|} a_i(t) a_j(t + |\tau_i - \tau_j|) dt$$

$$\rho_{i,j}^{(v)} = \frac{1}{T} \int_{T-|\tau_i - \tau_j|}^{T} a_i(t) a_j(t + |\tau_i - \tau_j|  - T) dt$$

k means the total users in the system,
i means the $i^{th}$ user,
j means the $j^{th}$ user,
$a_i$ means the spreading codes of the $i^{th}$ user,
$a_j$ means the spreading codes of the $j^{th}$ user,
$\tau_i$ means the delay time of the $i^{th}$ user,
$\tau_j$ means the delay time of the $j^{th}$ user;

Step 33: computing an input parameter $Z_{i,w}^{(0)}$:

$$Z_{i,w}^{(0)} = \frac{1}{T} \int_{wT+\tau_i}^{(w+1)T+\tau_i} r(t) a_i(t - wT - \tau_i) dt$$

wherein,
$Z_{i,w}^{(0)}$ means the $w^{th}$ bit value of the $i^{th}$ user
r(t) means the receiving signals; 1

Step 34: setting an executive parameter as 1, expressed as s=1;

Step 35: computing a result value, which can be shown as:

$$Z_{i,w}^{(s)} = Z_{i,w}^{(0)} - P_s \left\{ \sum_{l=1}^{k-1} [Z_{l,w}^{(s-1)} \rho_{i,l}^{(m)} + Z_{l,w+1}^{(s-1)} \rho_{i,l}^{(v)}] + \sum_{l=k+1}^{K} [Z_{l,w}^{(s-1)} \rho_{i,l}^{(m)} + Z_{l,w-1}^{(s-1)} \rho_{i,l}^{(v)}] \right\}$$

wherein, $P_s$ means the Partial Factor of the STAGE s;

Step 36: diagnosing whether the executive parameter is the recursion parameter? If "Yes", going to the Step 38, or going to the Step 37;

Step 37: adding 1 progressively to the executive parameter, then executing the Step 35;

Step 38: ending the process.

Figure 6A:
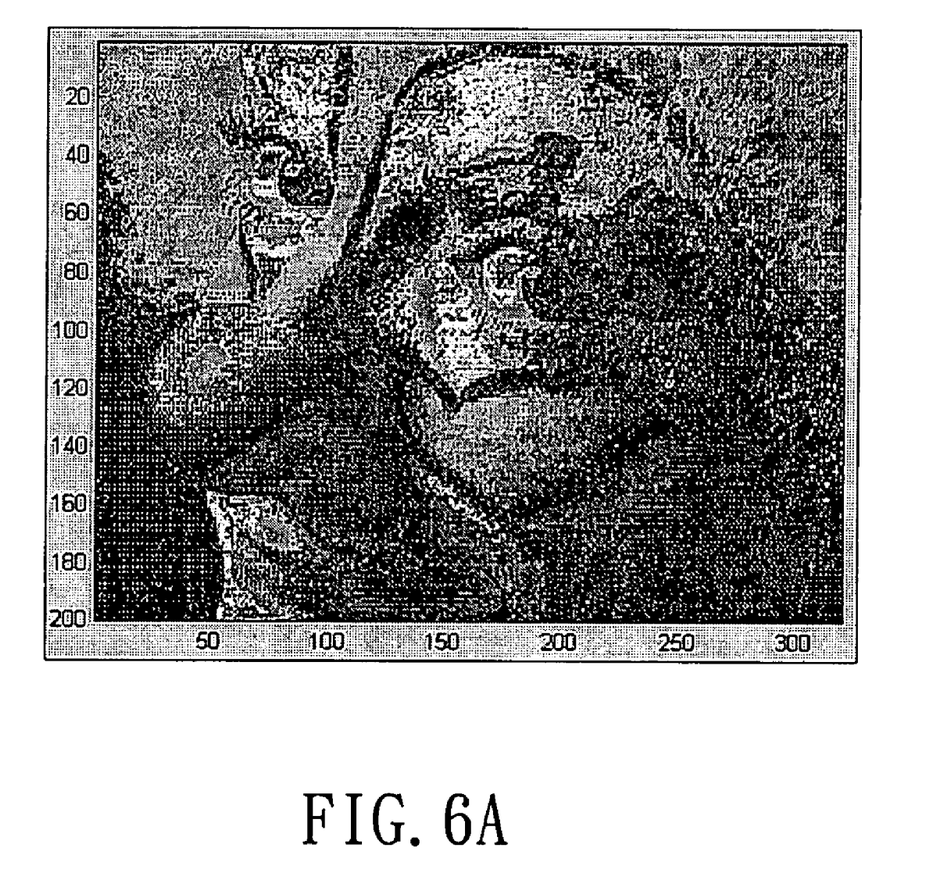
FIG. 6A is a schematic diagram showing the original signal receiving.
Figure 6B:
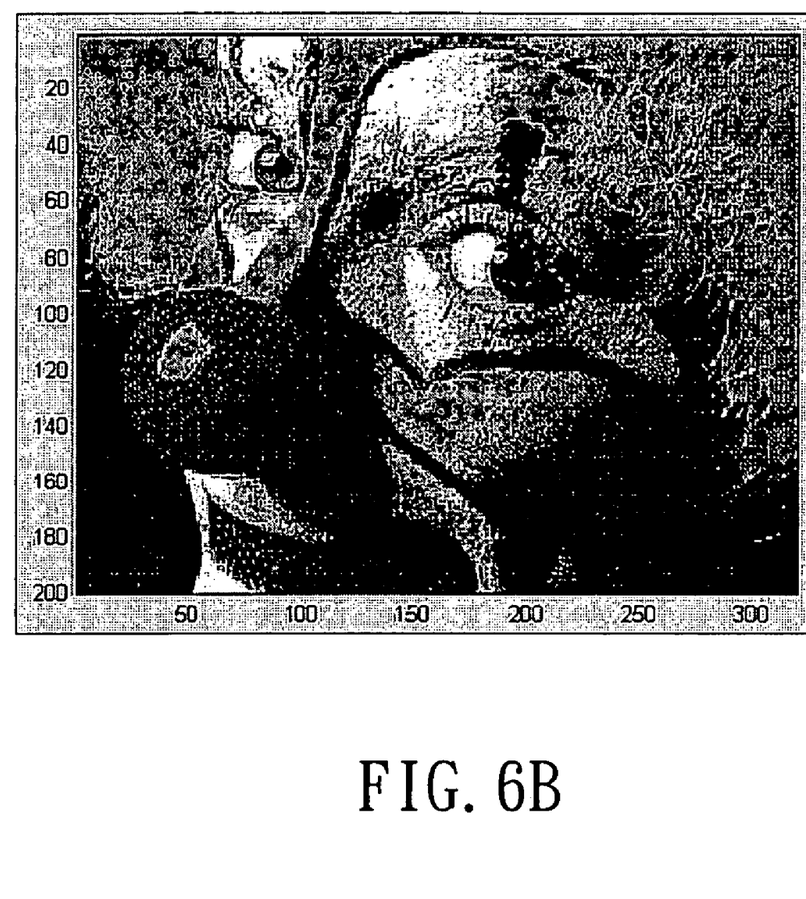
FIG. 6B is a schematic diagram showing the restoration status by using the present invention.

In some experiments, we can obtain a satisfied result by using only two or three stages, so the recursion parameter can be set as 2 or 3. Please refer to FIG. 6A, which is a schematic diagram showing the original signal receiving, and FIG. 6B, which is a schematic diagram showing the restoration status by using the present invention; obviously, the present invention is indeed useful.

In addition, the present invention can be also used to simplify the PIC; what needs to do is just to remove the Partial Factor of the formula in Step 35, and the result can be shown as:

$$Z_{i,w}^{(s)} = Z_{i,w}^{(0)} - \left\{ \sum_{l=1}^{k-1} [Z_{l,w}^{(s-1)} \rho_{i,l}^{(m)} + Z_{l,w+1}^{(s-1)} \rho_{i,l}^{(v)}] + \sum_{l=k+1}^{K} [Z_{l,w}^{(s-1)} \rho_{i,l}^{(m)} + Z_{l,w-1}^{(s-1)} \rho_{i,l}^{(v)}] \right\}$$

Moreover, in the synchronous Direct Spread-Code Division Multiple Access (DS-CDMA) system, the system delay time parameter is 0; that is, the delay times of all users are equal to 0. In such status, the embodiment of the present invention includes the following steps:

Step 41: receiving a system delay parameter and offering a recursion parameter;

Step 42: building a related matrix $\Re$ based on the system delay parameter, and wherein, $$\Re_{k \times k} = \lfloor r_{i,j} \rfloor$$

$$r_{i,j} = \begin{cases} \rho_{i,j}^{(m)}, & i < j \\ 0, & i > j \end{cases}$$

$$\rho_{i,j}^{(m)} = \frac{1}{T} \int_0^T a_i(t) a_j(t) \, dt$$

k means the total users in the system,
i means the $i^{th}$ user,
j means the $j^{th}$ user,
$a_i$ means the spreading codes of the $i^{th}$ user,
$a_j$ means the spreading codes of the $j^{th}$ user, Step 43: computing a input parameter $Z_{i,w}^{(O)}$:

$$Z_{i,w}^{(0)} = \frac{1}{T} \int_{wT+\tau_i}^{(w+1)T+\tau_i} r(t) a_i(t - wT - \tau_i) \, dt$$

wherein,
$Z_{i,w}^{(O)}$ means the $w^{th}$ bit value of the $i^{th}$ user
r(t) means the receiving signals;

Step 44: setting an executive parameter as 1, that is, s=1;

Step 45: computing a result value, which can be shown as:

$$Z_{i,w}^{(s)} = Z_{i,w}^{(0)} - P_s \sum_{\substack{l=1 \\ l \neq k}}^{K} Z_{l,w}^{(s-1)} \rho_{i,l}^{(m)}$$

wherein, $P_s$ means the Partial Factor of the STAGE s;

Step 46: diagnosing whether the executive parameter is the recursion parameter? If "Yes", going to the Step 48, or going to the Step 47;

Step 47: adding 1 progressively to the executive parameter, then executing Step 45;

Step 48: ending the process.

Figure 7:
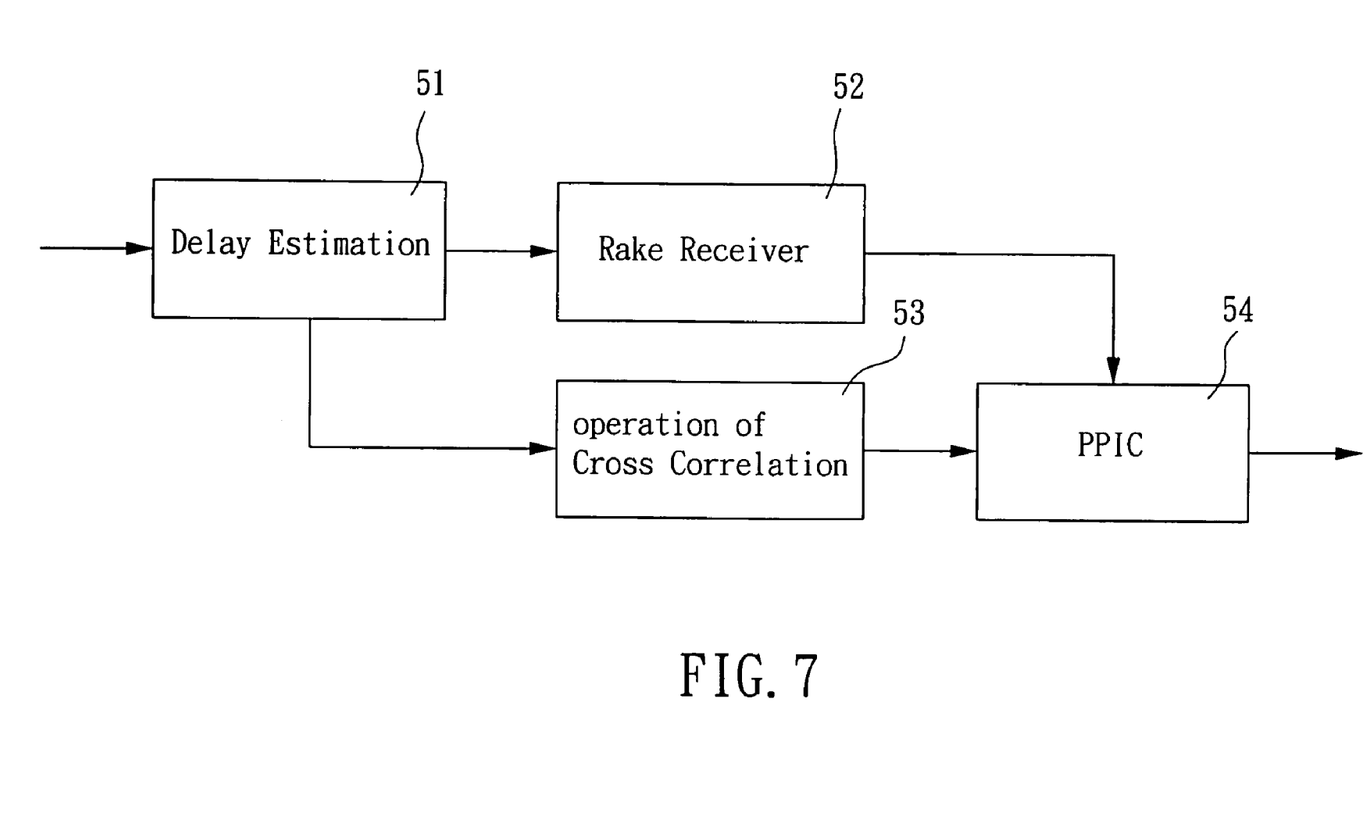
FIG. 7 is a schematic diagram showing the receiver system in which the Cross Correlation is drawn out from the PPIC.

The aforesaid algorithm deduction simplifies the traditional calculation of Respread-Despread, and the recursively operating mode also reduces the system complexity. Please refer to FIG. 7, which is a schematic diagram showing the receiver system in which the Cross Correlation is drawn out from the PPIC. As shown in FIG. 7, after passing through the Delay Estimation 51 to get the delay time information, the signals will be inputted to the Rake Receiver 53 and carried out the operation of Cross Correlation 52 simultaneously, inputted eventually into block 54 to execute the PPIC. Because the receiver allows the operating of both the Rake Receiver and the Cross Correlation simultaneously, it will not increase the delay time of the receiver that the Cross Correlation is drawn out from the PPIC. Furthermore, the simplified structure reduces the operating rate of the traditional PPIC from Chip Rate to Symbol Rate, and the original operating at Chip Rate can be completed by the operating of Cross Correlation; wherein, its operating rate is the same as that of the Rake Receiver.

However, the above description is only the preferable embodiment of the invention and cannot be used as a limitation for the scope of implementation of the invention. Any variation and modification made from the scopes claimed from the invention all should be included within the scope of the present invention, and hope your esteemed reviewing committee member examine this application favorably and permit it as a patent wishfully.

What is claimed is:

1. A method of Partial Parallel Interference Cancellation (PPIC) for recursively eliminating Multiple Access Interference of a received signal for a receiver, including the following steps:

A: receiving a system delay parameter and offering a recursion parameter;

B: building a related matrix $\Re$ based on the system delay parameter, wherein, $$\Re_{k \times k} = \lfloor r_{i,j} \rfloor$$

$$r_{i,j} = \begin{cases} \rho_{i,j}^{(m)}, & i < j \\ \rho_{j,i}^{(v)}, & i > j \end{cases}$$

$$\rho_{i,j}^{(m)} = \frac{1}{T} \int_0^{T - |\tau_i - \tau_j|} a_i(t) a_j(t + |\tau_i - \tau_j|) \, dt$$

$$\rho_{i,j}^{(v)} = \frac{1}{T} \int_{T - |\tau_i - \tau_j|}^{T} a_i(t) a_j(t + |\tau_i - \tau_j| - T) \, dt$$

k means the total users in the system,
i means the $i^{th}$ user,
j means the $j^{th}$ user,
$a_i$ means the spreading codes of the $i^{th}$ user,
$a_j$ means the spreading codes of the $j^{th}$ user,
$\tau_i$ means the delay time of the $i^{th}$ user,
$\tau_j$ means the delay time of the $j^{th}$ user;

C: computing an input parameter $Z_{i,w}^{(O)}$:

$$Z_{i,w}^{(0)} = \frac{1}{T} \int_{wT+\tau_i}^{(w+1)T+\tau_i} r(t) a_i(t - wT - \tau_i) \, dt$$

wherein,
$Z_{i,w}^{(O)}$ means the $w^{th}$ bit value of the $i^{th}$ user,
r(t) means the received signals;

D: setting an executive parameter equal to 1, expressed as s=1;

E: computing a result value, which can be shown as:

$$Z_{i,w}^{(s)} = Z_{i,w}^{(0)} - P_s \left\{ \sum_{l=1}^{k-1} [Z_{l,w}^{(s-1)} \rho_{i,l}^{(m)} + Z_{l,w+1}^{(s-1)} \rho_{i,l}^{(v)}] + \sum_{l=k+1}^{K} [Z_{l,w}^{(s-1)} \rho_{i,l}^{(m)} + Z_{l,w-1}^{(s-1)} \rho_{i,l}^{(v)}] \right\}$$

wherein, $P_s$ means the Partial Factor of the STAGE s;

F: determining whether the executive parameter is the recursion parameter;

G: If the executive parameter is the recursion parameter, then outputting $Z_{i,w}^{(s)}$ from the receiver;

H: If the executive parameter is not the recursion parameter, then increasing 1 to the executive parameter and then executing step E.

2. The method as recited in claim 1 is used in a asynchronous Direct Spread-Code Division Multiple Access (DS-CDMA) signal mode.

3. The method as recited in claim 1, wherein the system delay parameter means the delay time of each user in the system.

4. The method as recited in claim 3, wherein the delay time of each user can be arranged in order from shortest to longest.

5. The method as recited in claim 1, wherein the recursion parameter in step A is equal to 2.

6. The method as recited in claim 1, wherein the recursion parameter in step A is equal to 3.

7. The method as recited in claim 1, wherein diagonal elements of the matrix $\Re$ in step B are equal to zero.

8. The method as recited in claim 1 is used to simplify the Parallel Interference Cancellation (PIC).

9. The method as recited in claim 1 is used in a synchronous Direct Spread-Code Division Multiple Access (DS-CDMA) signal mode.

10. A method of Partial Parallel Interference Cancellation (PPIC) for recursively eliminating a Multiple Access Interference of a received signal, applied in a receiver with all users' delay time being zero and including the following steps:

A': receiving a system delay parameter and offering a recursion parameter;

B': building a related matrix $\Re$ based on the system delay parameter, wherein, $$\Re_{k \times k} = \lfloor r_{i,j} \rfloor$$

$$r_{i,j} = \begin{cases} \rho_{i,j}^{(m)}, & i < j \\ 0, & i > j \end{cases}$$

$$\rho_{i,j}^{(m)} = \frac{1}{T} \int_0^T a_i(t) a_j(t) \, dt$$

k means the total users in the system, i means the $i^{th}$ user, j means the $j^{th}$ user, $a_i$ means the spreading codes of the $i^{th}$ user, $a_j$ means the spreading codes of the $j^{th}$ user, C': computing an input parameter $Z_{i,w}^{(0)}$:

$$Z_{i,w}^{(0)} = \frac{1}{T} \int_{wT+\tau_i}^{(w+1)T+\tau_i} r(t) a_i(t - wT - \tau_i) \, dt$$

wherein, $Z_{i,w}^{(0)}$ means the $w^{th}$ bit value of the $i^{th}$ user, r(t) means the received signals;

D': setting an executive parameter equal to 1, expressed as s=1;

E': computing a result value, which can be shown as:

$$Z_{i,w}^{(s)} = Z_{i,w}^{(0)} - P_s \sum_{\substack{l=1 \\ l \neq k}}^{K} Z_{l,w}^{(s-1)} \rho_{i,l}^{(m)}$$

wherein, $P_s$ means the Partial Factor of the STAGE s;

F': determining whether the executive parameter is the recursion parameter;

G': If the executive parameter is the recursion parameter, then outputting $Z_{i,w}^{(s)}$ from the receiver;

H': If the executive parameter is not the recursion parameter, then increasing 1 to the executive parameter and then executing step E'.

11. The method as recited in claim 10, wherein the recursion parameter in step A is equal to 2.

12. The method as recited in claim 10, wherein the recursion parameter in step A is equal to 3.

* * * * *